United States Patent
Kennedy

(10) Patent No.: US 7,864,210 B2
(45) Date of Patent: Jan. 4, 2011

(54) SYSTEM AND METHODS FOR VIDEO CONFERENCING

(75) Inventor: Peter J. Kennedy, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1447 days.

(21) Appl. No.: 11/282,894

(22) Filed: Nov. 18, 2005

(65) Prior Publication Data

US 2007/0120971 A1 May 31, 2007

(51) Int. Cl.
*H04N 7/14* (2006.01)
(52) U.S. Cl. .............. 348/14.08; 348/14.01; 348/14.1
(58) Field of Classification Search ... 348/14.01–14.16, 348/576, 36; 381/92
See application file for complete search history.

(56) References Cited

U.S. PATENT DOCUMENTS

| | | | | |
|---|---|---|---|---|
| 3,601,530 | A * | 8/1971 | Edson et al. | 348/14.1 |
| 5,778,082 | A * | 7/1998 | Chu et al. | 381/92 |
| 5,959,667 | A | 9/1999 | Maeng | |
| 6,297,846 | B1 | 10/2001 | Edanami | |
| 6,469,732 | B1 | 10/2002 | Chang et al. | |
| 6,727,935 | B1 | 4/2004 | Allen et al. | |
| 6,826,284 | B1 | 11/2004 | Benesty et al. | |
| 6,850,265 | B1 | 2/2005 | Strubbe et al. | |
| 2002/0140804 | A1 | 10/2002 | Colmenarez et al. | |
| 2003/0160862 | A1 * | 8/2003 | Charlier et al. | 348/14.08 |
| 2005/0140779 | A1 * | 6/2005 | Schulz et al. | 348/14.08 |
| 2006/0164552 | A1 * | 7/2006 | Cutler | 348/576 |
| 2007/0035819 | A1 * | 2/2007 | Bahatt et al. | 359/366 |

OTHER PUBLICATIONS

Weng, J., et al., "Camera calibration with distortion models and accuracy evaluation", IEEE Trans. on P. Anal. & Machine Intel., vol. 14, No. 10, pp. 965-980, Oct. 1992.
Bax, M., "Real-Time Lens Distortion Correction: 3D Video Graphics Cards are Good for More Than Games", Stanford ECJ, Spring 2004.

* cited by examiner

*Primary Examiner*—Melur Ramakrishnaiah
(74) *Attorney, Agent, or Firm*—Novak Druce + Quigg LLP

(57) ABSTRACT

A system for generating video images and corresponding audio of multiple parties engaged in a video conference is provided. The system includes multiple voice transducers for receiving voice signals from the multiple parties and a video camera for capturing moving images of one of the multiple parties who is speaking. The system further includes a processor in communication with the voice transducers and video camera. The processor determines respective distances and angles between the party who is speaking and each of the multiple voice transducers. Additionally, the processor identifies a location of the party who is speaking relative to the video camera based on the determined respective distances and angles. Based on the identified location, the processor selects a portion of a video frame produced by video camera and processes the selected portion to mitigate optical distortion and generate an overall picture in which the party speaking does not appear unnaturally small relative to the overall picture.

20 Claims, 6 Drawing Sheets

SYSTEM AND METHODS FOR VIDEO CONFERENCING

FIELD OF THE INVENTION

The present invention is related to the field of electronic communications and, more particularly, to electronic video conferencing.

BACKGROUND OF THE INVENTION

Video conferencing allows parties remote from one another to participate visually as well as aurally in a multi-party conference. Video conferencing provides an efficient mechanism by which multiple parties can confer with one another on business or other matters without having to incur the added expenses and time for traveling to a common venue. Although audio-only conferences provide one alternative to video conferencing, it is generally recognized that communications are enhanced when the audio aspect of conferencing includes a visual dimension as well.

Nevertheless, a persistent shortcoming of video conferencing is that conventional technology typically provides only a static view at each location of the conference. If more than one party is participating in the video conference at the same location, a fixed camera view may not be framed to adequately capture an image of each of the different parties. A particular party may not be well framed by the camera or may even be completely out of view of the camera when the particular party is speaking.

FIG. 1 schematically illustrates a conventional camera single-camera set up 100 for a video conference involving three parties at a particular location. With this typical single-camera set up, participant A is only partially in view because of the lens angle of the camera 102. Participant B is in view, but participant C is completely out of view. The problem stems from the limited field of the camera and the limits of the angle of view of its lens.

One solution, of course, is to physically change the direction of the camera as the different parties speak. This can be distracting, however, if one of the parties has to assume this task. A non-participant can be given the task. At the very least, however, the opportunity cost of the non-participant's time must be factored into the expense of the conference. Moreover, in some instances, the confidential nature of the conference may dictate that only select individuals be included in the conference, thus limiting the choice of a non-participant who can assume the task of directing the camera appropriately during the conference. The intermittent movements of the camera also can be distracting to the participants regardless of who is given the task of moving the camera.

Still another solution is to use a relatively wide-angle lens on the camera. A drawback of this solution, however, is that a wide-angle lens tends to distort the optical image rendered by the camera. Thus, even though all the conference parties are "in view," their individual images tend to be small and distorted. Optical distortion introduced by the wide acceptance angle of a wide-angle lens can be removed from an image using known mathematical transformations of the video data generated by the camera, but even this approach typically results in images of individual participants appearing very small within the overall picture. These problems are inherent in a multi-party video conference where video and audio feeds are conveyed to different locations in real-time. The same problems also arise in the context of a recorded video conference such as a recorded video deposition. Accordingly, there is as yet no mechanism that is both effective and efficient for providing an adequate view of multiple parties at a single location during a real-time, multi-location video conference or a recorded, single-location video conference.

SUMMARY OF THE INVENTION

The present invention provides a system, related methods, and a computer product for providing video images and corresponding audio from a location at which multiple parties participate in a video conference. The video images and corresponding audio can be communicated to other parties at one or more other locations or recorded.

One embodiment of the invention is a method of providing video images and corresponding audio of multiple parties engaged in a video conference. The method can include determining respective distances and angles between one of the multiple parties who is speaking and a plurality of voice transducers. Additionally, the method can include identifying a location of the party who is speaking relative to a video camera based on the measured relative distances and angles. The method can further include processing a selected portion of a video image generated by the video camera. The portion of the video image can be selected based on the identified location. The portion of the video image selected for processing is a portion that contains an image of the party who is speaking.

Another embodiment of the invention is a system for providing video images and corresponding audio of multiple parties engaged in a video conference. The system can include a plurality of voice transducers for receiving voice signals from the multiple parties, and a video device for capturing moving images of one of the multiple parties who is speaking. The system also can include a processor in communication with the plurality of voice transducers and the video device. The processor can determine respective distances and angles between one of the multiple parties who are speaking and each of the plurality of voice transducers. The processor also can identify a location of the party who is speaking relative to the video camera based on the measured relative distances and angles. Based on the identified location, the processor can selectively process a portion of a video frame produced by the video camera. The portion selected for processing can be that portion of the video frame that contains an image of the party who is speaking.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

The invention provides video images and speech of multiple parties who participate from the same location in a multi-location video conference so that each of the multiple parties can be seen and heard at other locations. Optical distortion of video images of a party that happens to be speaking, according to the invention, can be substantially reduced or eliminated without the speaker's appearing inordinately small relative to the overall picture seen at other locations of the video conference. The video images and corresponding audio can be generated without the assistance of technical support personnel.

Figure 1:
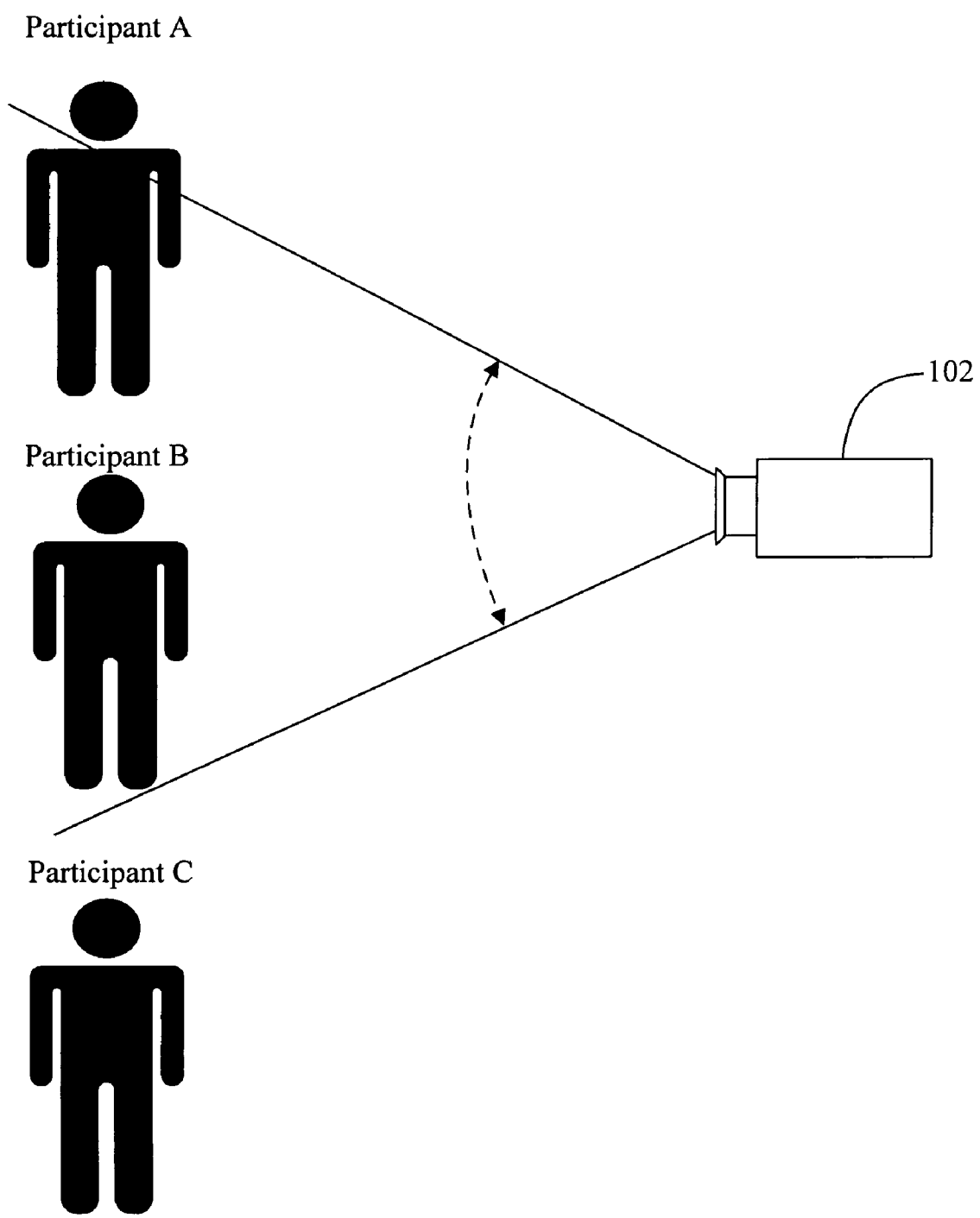
FIG. 1 is a schematic diagram of a system for providing video images and corresponding audio during a video conference, according to conventional mechanisms.
Figure 2:
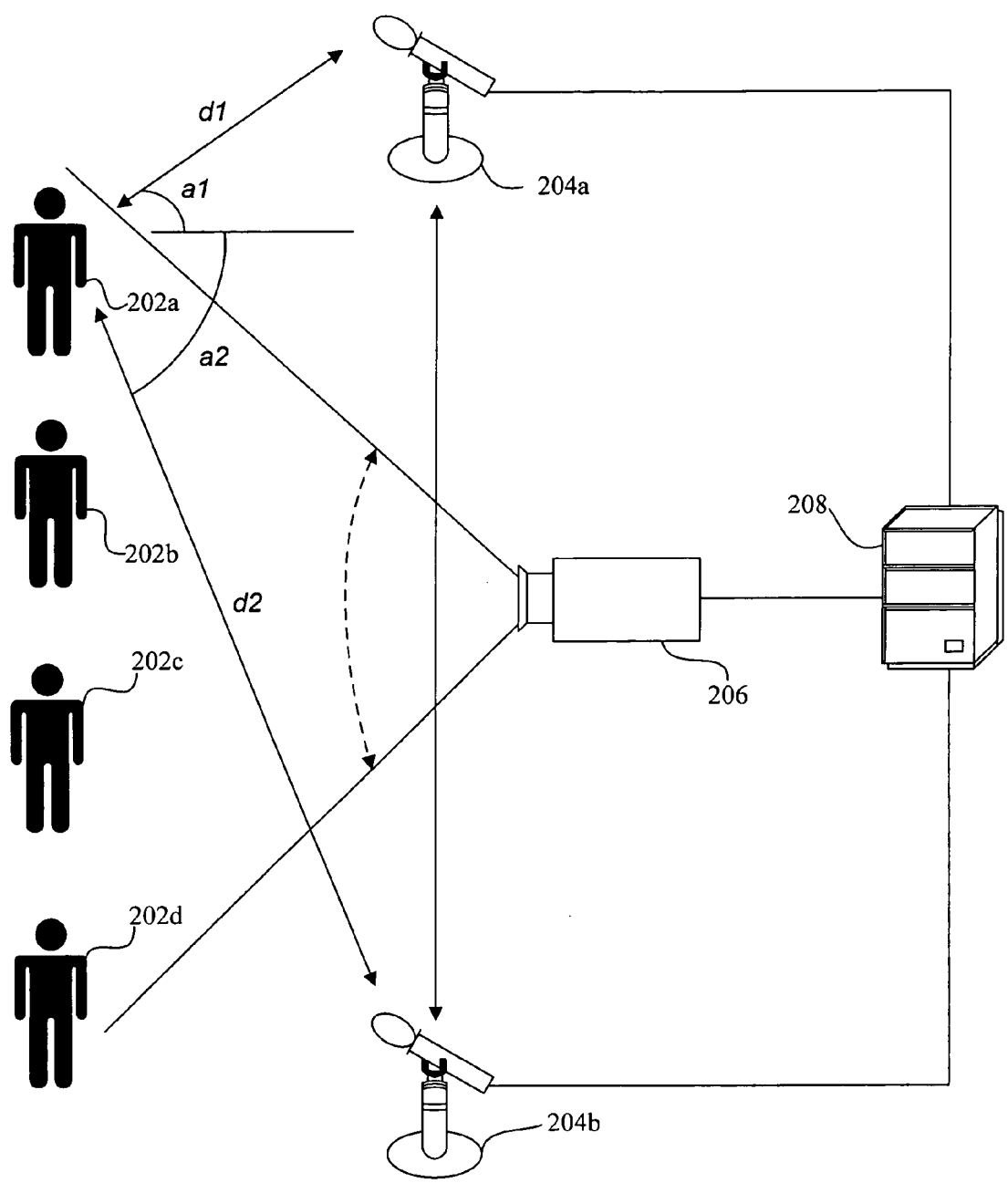
FIG. 2 is a schematic diagram of a system for providing video images and corresponding audio during a video conference, according to one embodiment of the invention.

FIG. 2 is a schematic view of a system 200 for providing video images and corresponding audio of multiple parties 202a-d engaged in a video conference at a single location, according to one embodiment of the invention. The system 200 illustratively includes multiple voice transducers 204a, 204b for capturing voice signals from the multiple parties 202a-d as they speak. Additionally, the system 200 illustratively includes a video camera 206 for capturing moving images of a party who is speaking. The system 200 further illustratively includes a processor 208 in communication with each of the voice transducers 204a, 204b and with the video camera 206.

The voice transducers 204a, 204b generate electrical audio signals based in response to acoustic sound waves generated when one of the multiple parties 202a-d speaks. The video camera 206 captures video images of the parties 202a-d, also in the form of electrical signals. The audio signals and video images are fed to the processor 208. The video camera 206 preferably includes a wide-angle lens.

Operatively, the processor 208 determines the respective distances d1, d2 and angles a1, a2 between a party 202a who is speaking and each of the voice transducers 204a, 204b. The processor 208 then identifies the location of the party 202a speaking relative to the video camera 206 based on the respective distances and angles, d1, d2 and a1, a2. Based on the identified location of the party 202a speaking relative to the video camera 206, the processor 208 processes a selected portion of the video image captured by the video camera 206. The portion selected by the processor 208 for processing is that portion of the video image containing the image of the party 202a who is speaking.

The distance between each of the voice transducers 204a, 204b can be fixed with respect to the video camera 206. The respective distances d1, d2 and angles a1, a2 between the party 202a who is speaking and each of the voice transducers 204a, 204b, however, can vary if the party who is speaking moves relative to the voice transducers. Therefore, according to the invention, the processor 208 automatically determines the respective distances and angles between the party 202a and the voice transducers 204a, 204b. The distances and angles can be determined on the basis of the velocity of the sound of the speaker's voice and audio signals generated by the plurality of voice transducers 204a, 204b.

The processor 208 can identify the location of the party 202a speaking relative to the video camera 206 using known methods of triangulation. A triangulation method, accordingly, is applied by the processor 208 to determine the distances d1, d2 and angles a1, a2 between the party 202a speaking and the voice transducers 204a, 204b. The identification of the location of the party 202a speaking, more particularly, can be made using a triangulation algorithm implemented by the processor 208. The processor 208, moreover, can be implemented in dedicated hardwired circuitry, machine-readable code, or a combination of circuitry and code.

The location of the party 202a speaking relative to the video camera 206 dictates which portion of the video image contains the image of the party speaking. Accordingly, once the location of the party 202a speaking is determined by the processor 208, the processor is able to select the appropriate portion of the video image that is to be processed. The processor 208 selects the appropriate portion of the video image, crops the selected portion, and removes from the selected portion optical distortion induced by the wide-angle lens. The optical distortion can be removed by the processor 208 applying an optical correction algorithm.

Different types of optical corrections can be performed by the optical processor 208, which can be configured to implement one or more known optical correction algorithms. One type of correction the optical processor 208 can perform using known algorithms is fisheye-to-rectilinear correction. Another type of correction is point-of-view correction. Other types of spatial and/or perspective optical corrections can be performed by the optical processor 208, using other known algorithms.

Optical correction for correcting lens distortion in real-time, for example, can be based on an infinite series that fully models lens distortion. The model is described, for example, in C. C. Slama, C. Theurer, and S. W. Henriksen, eds., *Manual of Photogrammetry*, 4$^{th}$ ed., Amer. Soc. Photogrammetry and Remote Sensing (January 1980.), and J. Weng, P. Cohen, and M. Herniou, "Camera Calibration with Distortion Models and Accuracy Evaluation," *IEEE Trans. Patt. Anal. Machine Intell.*, vol. 14, no. 10, pp. 965-980 (October 1992), both of which are incorporated herein.

More particularly, the dominant radial distortion (also referred to as barrel or pincushion distortion) can be modeled using a single parameter, $\kappa_1$, as described in R. Y. Tsai, A Versatile Camera Calibration Technique for High-Accuracy 3D Machine Vision Metrology Using Off-The-Shelf TV Cameras and Lenses, *IEEE J. Robotics Automat.*, vol. 3, no. 4, pp. 323-344 (August 1987), also incorporated herein by reference. According to a model provided by M. R. Bax at <www.standard.edu/group/ieee/ecj/docs/ EJC_demo.pdf>, the position of a pixel in the image projection plane is denoted $\hat{u}=(u,v)$, and $u_0$ denotes the image position where the optical axis pierces the plane. The radius of the point within the distorted image, therefore, is $r_d=\|u-u_0\|$, and a radial lines distortion is modeled as $r_u=r_d(1+\kappa_1 r_d^2)$, where $r_u$ is the correct, undistorted radius. The variable $r_d$ is obtained by solving the previous equation. Specifically, application of Vieta's substitution, $$r_d = \omega - \frac{1}{3\kappa_1 \omega},$$

known to those of ordinary skill in the art, yields the following equation $$(\omega^3)^2 - \frac{r_u}{\kappa_1}\omega^3 - \frac{1}{27\kappa_1^3} = 0,$$

the solution of which is $$\omega = \sqrt[3]{\frac{r_u}{2\kappa_1} \pm \sqrt{\frac{r_u^2}{4\kappa_1^2} + \frac{1}{27\kappa_1^3}}}.$$

Other models of optical distortion are known, and the models cited herein are merely exemplary. As already noted, moreover, there are various existing algorithms known to those of ordinary skill in the art that can be implemented by the processor 208 for performing different types of optical corrections. Different types of corrections can be performed by combining different algorithms implemented by the processor 208. More particularly, according to another embodiment of the invention, the processor 208 implements the desired type or types of optical correction using a pre-selected software package or a combination of different software packages. Indeed, an advantage of the invention is that it can be implemented using a variety of different off-the-shelf optical correction software products or graphic cards, as will be readily appreciated by one of ordinary skill in the art.

The processing of the video image by the processor 208 mitigates geometric distortion of the image. Processing only the selected portion of the image avoids distorting the relative size of the image of the party 202a speaking. Thus, by processing only that portion of the image selected, a video image is generated of the party 202a who is speaking that is substantially free of optical distortion, but in which the size of the party speaking does not appear unnaturally small in relation to the overall picture generated by the video camera 206.

The processing of the video image by the processor 208 can also automatically center the image of the party 202a who is speaking in video frames generated by the system 200 without changing the view direction of the video camera 206. When one of the parties 202a-d stops speaking and another begins to speak, the image of the party speaking is automatically re-centered without changing the view direction of the video camera 206. Re-centering the image on the new speaker is accomplished automatically by the computing, determining, and processing functions performed by the processor 208, as already described. Eliminating the need to change the view direction of the video camera 206 mitigates distraction to the multiple parties 202a-d that would otherwise arise if the video camera were to move each time a different party began speaking. The system 200 also obviates the need for technical support personnel to control movements of the video camera 206 as one party stops speaking and another begins to speak.

Moreover, although the video camera 206 and voice transducers 204a, 204b are shown as separate devices, in an alternative embodiment, the voice transducers are mounted to the video camera to form a single, integrated device. Accordingly, the voice transducers 204a, 204b, can comprise direction-specific voice transducers, such as directional microphones, for processing voice signals emanating from particular directions relative to the video camera 206 upon which each is mounted.

Figure 3:
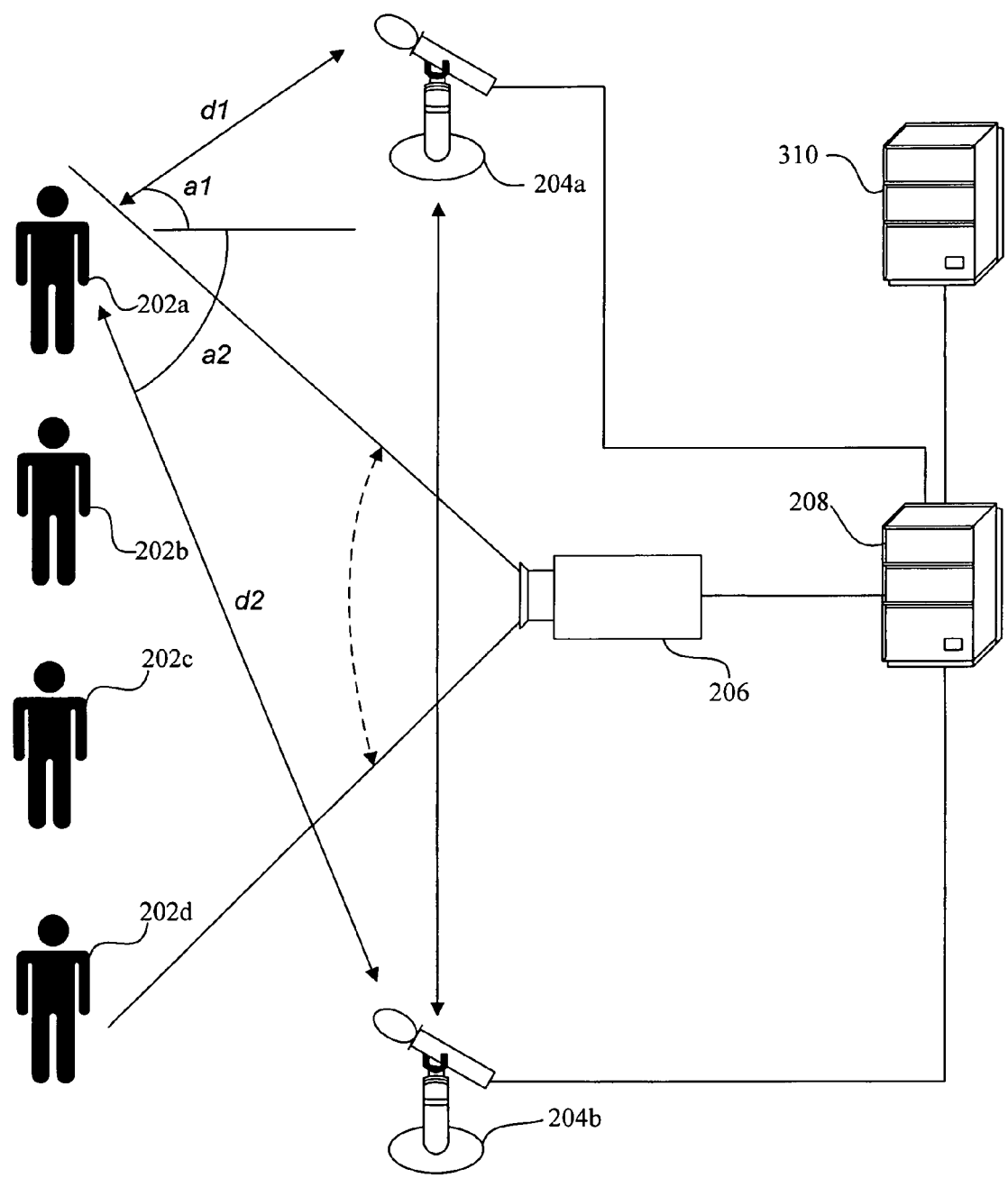
FIG. 3 is a schematic diagram of a system for providing video images and corresponding audio during a video conference, according to another embodiment of the invention.

A system 300 for providing video images and corresponding audio for a video conference at a single location, according to another embodiment of the invention, further includes a communications unit 310 communicatively linked to the processor 208 to receive video and audio feeds from the processor, as schematically illustrated in FIG. 3. The communications unit 310 can be a transceiver for transmitting and/or receiving video and audio. The communications unit 310 can thus link the parties 202a-d to one or more remote sites where other parties are participating in the same video conference.

The communications unit 310, accordingly, can be a wireless transceiver. Alternatively, the communications unit 310 can be serve as a bridge to a wire-line network that carries video and audio feeds between remote sites. Although the communications unit 310 is illustratively a separate device, the operative elements of the communications unit can instead be combined with those of the processor 208 into a single device.

According to still another embodiment, the communications unit 310 can be a server connected to a data communications network, such as the Internet or a local area network (LAN), for conveying video and audio via data packets. According to yet another embodiment, the communications unit 310 can comprise a recording device for electronically recording in an electronic storage medium the video images and audio of the parties 202a-d. The recording of video images and audio can be used, for example, to record proceedings of an academic, a business, or other conference. The recording can also be of a deposition, for example, involving multiple participants.

Figure 4:
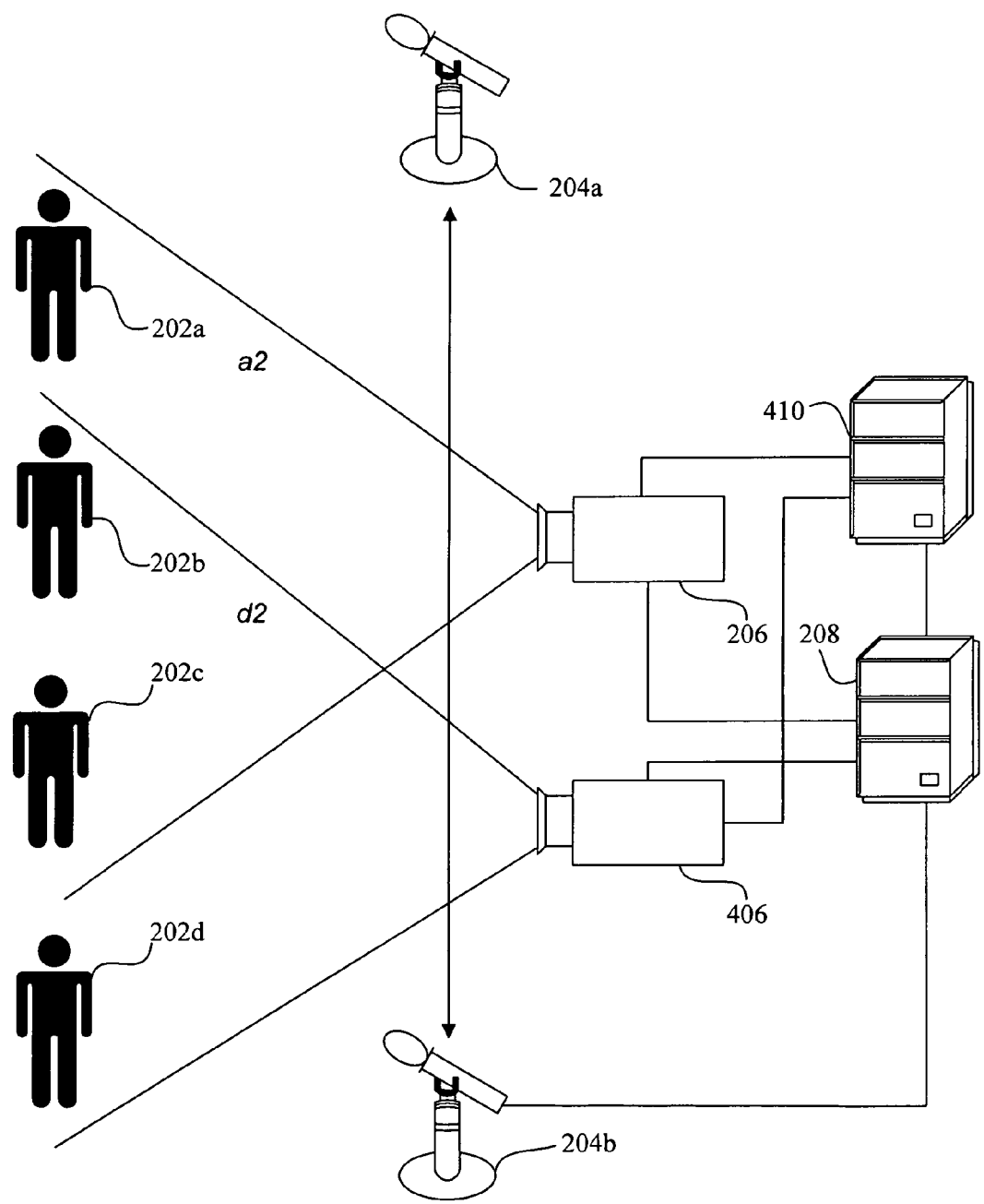
FIG. 4 is a schematic diagram of a system for providing video images and corresponding audio during a video conference, according to still another embodiment of the invention.

According to still another embodiment, as schematically illustrated by FIG. 4, a system 400 for providing video images and corresponding audio for a video conference at a single location further includes one or more additional video cameras 406 arranged in predetermined positions relative to each of the multiple parties 202a-d. Each additional video camera 406 can be communicatively linked to the processor 208 to provide respective video and audio feeds to the processor. The system 400 can include along with a plurality of video cameras a camera selecting unit 410 for selecting one of the plurality of video camera for providing the video images and corresponding audio signals that are either transmitted or recorded. The selection by the camera selecting unit, moreover, can select one video camera from among the different video cameras according to which generates a better image based on a pre-selected quality or other criterion. Although illustratively a separate unit, the operative elements of the camera selecting unit 410, alternatively, can be combined into a single unit with those of the processor 208.

Figure 5:
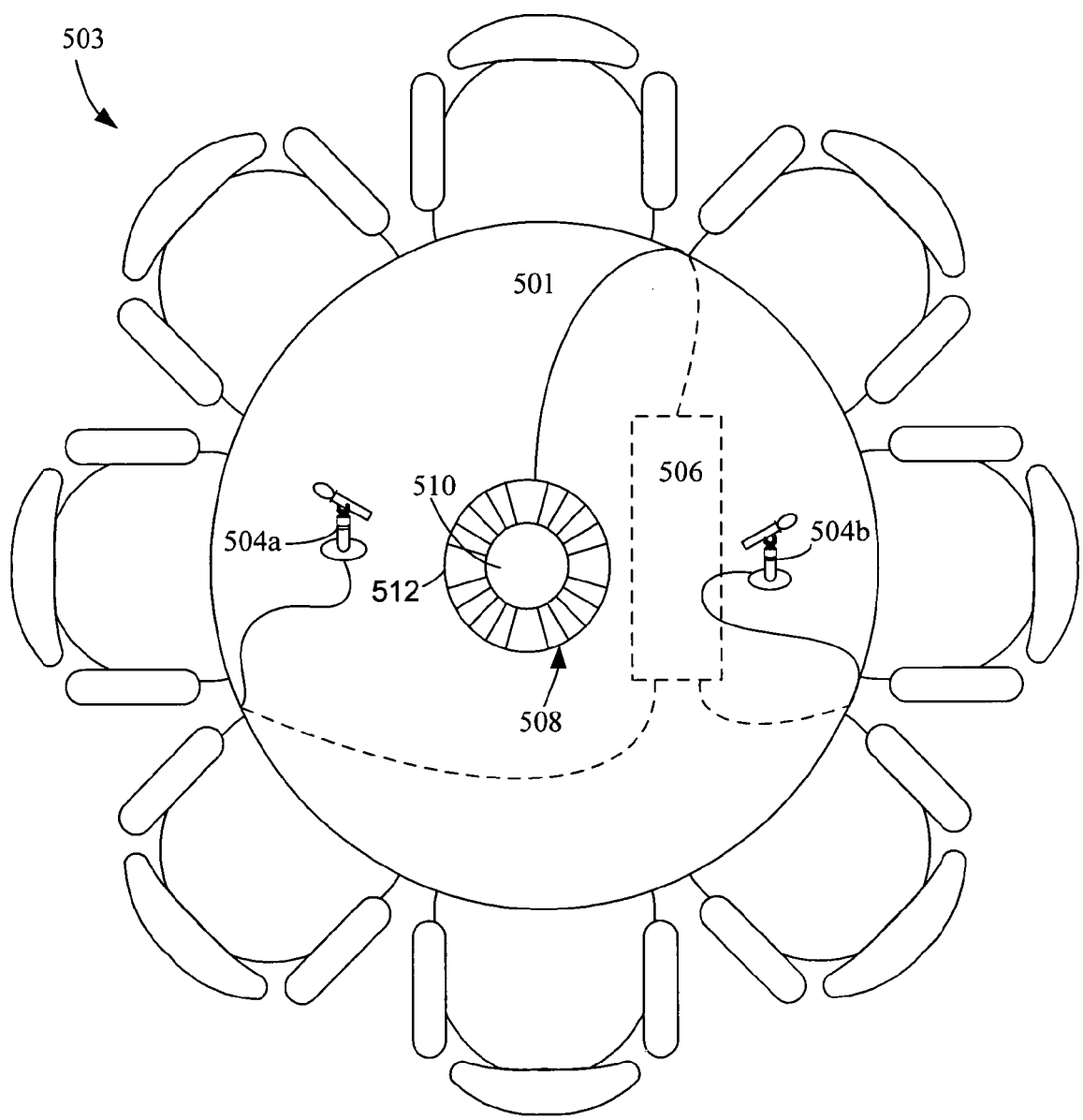
FIG. 5 is a schematic diagram of a system for providing video images and corresponding audio during a video conference, according to yet another embodiment of the invention.

FIG. 5 is a schematic diagram of a system 500 according to yet another embodiment of the invention. The system 500 is illustratively used in a setting such as an office or conference room and includes a table-and-chairs configuration 503 that can accommodate a group of conferees. Positioned on the table 501 are a pair of microphones 504a, 504b for broadcasting in real time or recording the voice utterances of the conferees. More than two microphones can be used depending on factors such as the size and/or arrangement of the particular setting and number of conferees. Indeed, in the illustrated arrangement, since the conferees can arrange themselves around a circular table, a third, disambiguation microphone (not shown) can be added to mitigate the risk of ambiguity that could otherwise were the two cameras to be positioned along a straight line between two conferees directly across from one another.

The electrical signals generated by the microphones 504a, 504b in response to the voice utterances are fed by wireline feed to a processor 506, which is illustratively positioned under the table. In an alternative embodiment, one or both of the microphones wirelessly transmits the signals to the processor 506.

The processor 506, based on the signals, identifies a location of the party who is speaking relative to a video camera 508, the identification being based on the measured relative distances and angles as described above. The video camera illustratively comprises a fisheye lens 508 mounted on a base 510 positioned on the table 501. Video signals from the video camera 508 are fed or wirelessly transmitted to the processor 506 positioned underneath the table 501. Based on the identified location of the party speaking, the processor 506, processes a selected portion of a video image generated by the video camera. As also described above, the portion selected for processing is that portion of the video image that contains an image of the party who is speaking.

The system 500 can be used, for example, to connect the conferees with other participants in a multi-location conference call in real-time. Alternatively, the system 500 can provide a record of various types of proceedings, such as a business meeting or deposition. The system 500, of course, generates the record by recording the audio and video signals during the particular proceeding, as already described. Thus, according to one embodiment, the system 500 can be transported by a court reporter or business executive, who places the video camera 508 and microphones 504a, 504b in a carry case (not shown) along with the processor 506, and carries the system to a conference room or other setting in which the system will be used to record a deposition or business meeting. Although shown as separate devices, the microphones 504a, 504b and video camera 508, according to an alternative embodiment, can comprise a single, integrated device that can be conveniently ported between different conference locations.

Figure 6:
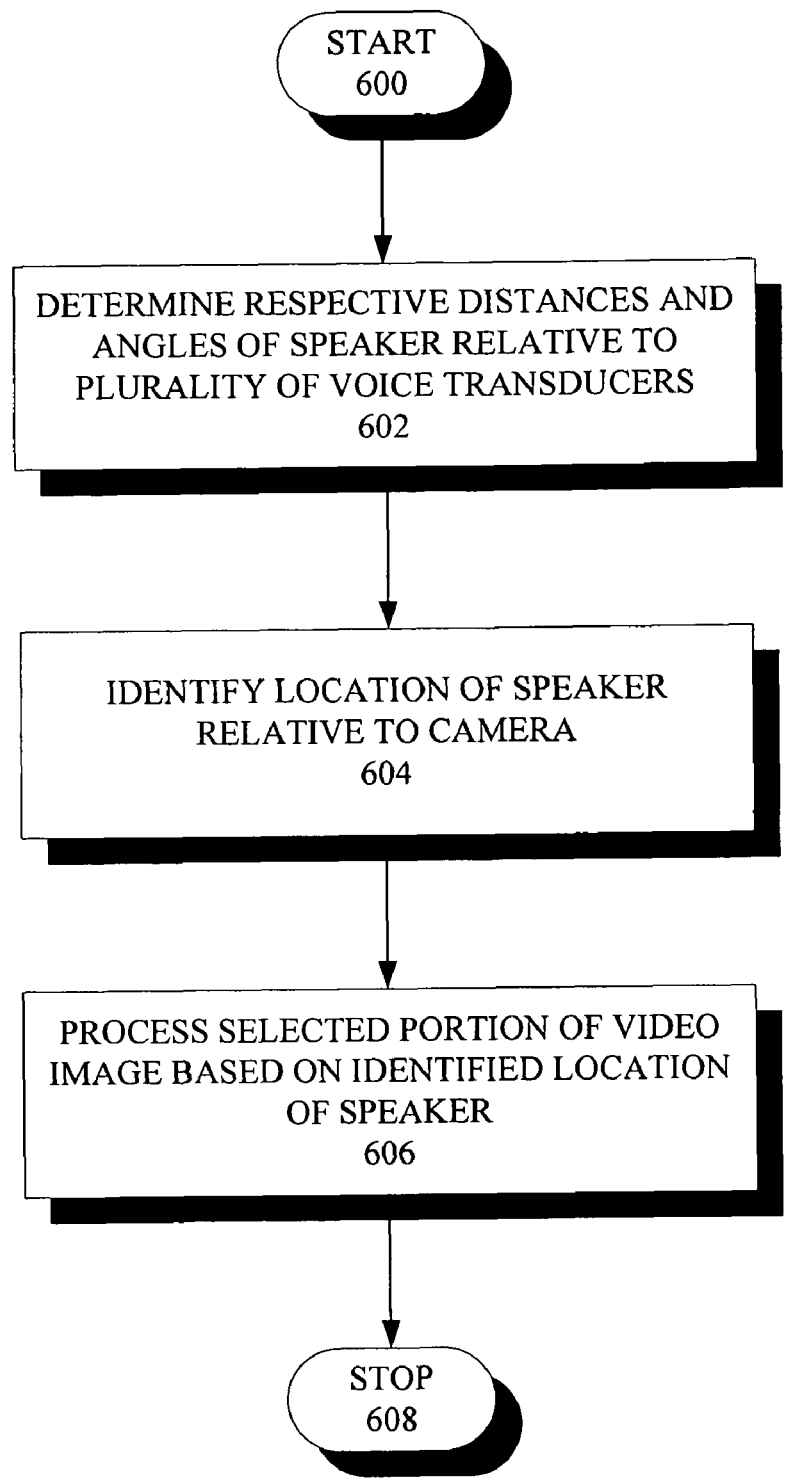
FIG. 6 is flowchart of exemplary steps of a method for providing video images and corresponding audio during a video conference, according to still another embodiment of the invention.

FIG. 6 is a flowchart of the exemplary steps of a method 600 for providing a video feed from a location at which multiple parties participate in a video conference, according to yet another embodiment of the invention. The method 600 includes, at step 602, determining the respective distances and angles between one of the multiple parties who is speaking and a plurality of voice transducers. The respective distances and angles can be computed based on the speed of sound of the voice of the party who is speaking.

Additionally, the method 600 includes, at step 604, identifying a location of the party who is speaking relative to a video camera, the determination being based on the measured respective distances and angles. The determination can be based upon audio signals generated by the plurality of voice transducers since the velocity of the voice signals generated by the party speaking is known.

The method 600 further includes at step 606 processing a selected portion of a video image generated by the video camera based on the identified location. More particularly, the portion selected for processing is the portion of the video image that contains an image of the party who is speaking. Optionally, the step 606 of processing can further include substantially centering video images of the party who is speaking within corresponding video frames produced by the video camera during a period in which the party is speaking. According to another embodiment, the steps 602-606 of determining, identifying, and processing can be repeated for different ones of the plurality of parties during respective periods when different parties are speaking during the video conference.

According to still another embodiment, the video image can comprise a plurality of video images, and the method 600 can further include supplying the video images and corresponding audio in the form of video and audio feeds to a communications unit in real-time. Alternatively, the video and audio feeds can be supplied to a communications unit for recording the video images and audio.

The method 600 according to yet another embodiment can further include performing the steps 602-606 of determining, identifying, and processing with respect to at least two video cameras as one of the multiples parties is speaking. Optionally, one of the plurality of video cameras can be selected according to which of the plurality of video cameras generates a best image according to a pre-selected quality or other criterion. The method 600 illustratively concludes at step 608.

The invention can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

I claim:

1. A method of providing video images and corresponding audio of multiple parties engaged in a video conference, the method comprising:
   determining respective distances and angles between one of the multiple parties who is speaking and a plurality of voice transducers;
   identifying a location of the party who is speaking relative to a video camera based on the measured relative distances and angles;
   based on the identified location, processing a selected portion of a video image generated by the video camera, the portion selected for processing being that portion of the video image that contains an image of the party who is speaking.

2. The method of claim 1, wherein the step of determining comprises computing the respective distances and angles based upon audio signals generated by the plurality of voice transducers.

3. The method of claim 1, wherein the step of identifying comprises identifying the location based upon a triangulation algorithm.

4. The method of claim 1, wherein the step of processing comprises altering the selected portion of the video image according to an optical correction algorithm.

5. The method of claim 1, wherein the step of processing comprises altering the selected portion of the video image by cropping a video frame containing an image of the party who is speaking.

6. The method of claim 1, wherein the step of processing substantially centers video images of the party who is speaking within corresponding video frames produced by the video camera during a period in which the party is speaking.

7. The method of claim 1, wherein the steps of determining, identifying, and processing are repeated for different ones of the plurality of parties during respective periods when different parties are speaking during the video conference.

8. The method of claim 1, wherein the step of determining comprises determining the distances and angles based upon a velocity of voice sound generated by the party who is speaking.

9. The method of claim 1, wherein the video image comprises a plurality of video images, and further comprising supplying the video images in the form of a video feed to a communications unit in real-time.

10. The method of claim 1, wherein the video image comprises a plurality of video images, and further comprising supplying the video images in the form of a video feed to a video recorder.

11. The method of claim 1, wherein the video camera comprises a plurality of video cameras arranged in predetermined positions relative to each of the multiple parties, and further comprising performing the steps of determining, identifying, and processing with respect to at least two of the plurality of video cameras as one of the multiples parties is speaking.

12. The method of claim 10 further comprising selecting one of the plurality of video cameras according to which of the plurality of video cameras generates a best image according to a pre-selected quality criterion.

13. A system for providing video images and corresponding audio of multiple parties engaged in a video conference, the system comprising:
   a plurality of voice transducers for receiving voice signals from the multiple parties;
   at least one video device for capturing moving images of one of the multiple parties who is speaking; and
   a processor in communication with the plurality of voice transducers and at least one video device for
      determining respective distances and angles between one of the multiple parties who is speaking and each of the plurality of voice transducers,
      identifying a location of the party who is speaking relative to the at least one video camera based on the measured relative distances and angles, and
      based on the identified location, selectively processing a portion of a video frame produced by the at least one video camera, the portion selected for processing being that portion of the video frame that contains an image of the party who is speaking.

14. The system of claim 13, further comprising a communications unit communicatively linked to the processor for receiving video images with corresponding audio signals from the processor and conveying same to at least one other location.

15. The system of claim 14, wherein the communications unit comprises a wireless communications device for wirelessly transmitting the video images and corresponding audio signals to the at least one other location.

16. The system of claim 13, further comprising a recording unit communicatively linked to the processor for receiving video images with corresponding audio signals from the processor and electronically recording same in an electronic storage medium.

17. The system of claim 13, wherein the at least one video device comprises a plurality of video devices arranged in predetermined positions relative to each of the multiple parties, and further comprising a selection unit for selecting one of the plurality of video devices according to which of the plurality of video devices generates a better image based on a pre-selected quality criterion.

18. A computer-readable storage medium, the storage medium comprising computer instructions for:
   determining respective distances between one of the multiple parties who is speaking and a plurality of voice transducers;
   identifying a location of the party who is speaking relative to a video device based on the measured relative distances;
   based on the identified location, selectively processing a portion of a video frame produced by the video device, the portion selected for processing being that portion of the video frame that contains an image of the party who is speaking so as to mitigate geometric distortion of a video image of the party who is speaking.

19. The computer-readable storage medium of claim 18, wherein the instruction for measuring measures the relative distances using audio data generated by the plurality of voice transducers.

20. The computer-readable storage medium of claim 18, wherein the instruction for determining comprises a triangulation algorithm.

* * * * *